United States Patent [19]
Wagener et al.

[11] Patent Number: 5,875,203
[45] Date of Patent: Feb. 23, 1999

[54] STABLE FIBER ASE SOURCES INCORPORATING SPECTRAL FILTERING

[75] Inventors: Jefferson L. Wagener, New Providence, N.J.; Craig W. Hodgson, Mountain View; Dario G. Falquier, Menlo Park, both of Calif.

[73] Assignee: The Board of Trustees of the Leland Stanford Junior University, Stanford, Calif.

[21] Appl. No.: 764,577

[22] Filed: Dec. 13, 1996

[51] Int. Cl.[6] .................................................. H01S 3/30
[52] U.S. Cl. ................................ 372/6; 372/32; 372/34; 372/1
[58] Field of Search .................... 372/6, 31, 34, 372/29, 70, 69

[56] References Cited

U.S. PATENT DOCUMENTS

| | | | |
|---|---|---|---|
| 4,938,556 | 7/1990 | Digonnet et al. | 372/6 |
| 5,185,749 | 2/1993 | Kalman et al. | |
| 5,189,676 | 2/1993 | Wysoki et al. | |
| 5,255,274 | 10/1993 | Wysoki et al. | |
| 5,355,216 | 10/1994 | Kim et al. | |
| 5,668,821 | 9/1997 | Hodgson et al. | 372/6 |

OTHER PUBLICATIONS

Hodgson et al; "Spectrallty shaped high power amplified spontaneous emisson source incorporating long–preiod gratings" OFC'96 Technical Digest pp. 29–30.

Emmanuel Desurvire and J.R. Simpson, Amplification of Spontaneous Emission in Erbium–Doped Single–Mode Fibers, *Journal of Lightwave Technology*, IEEE, vol. 7, No. 5, May 1989.

Justin Judkins, et al., Temperature Insensitive Long–Period Fiber Gratings, *Optical Fiber Communications*, PD1–1, Feb. 1996.

G. Grasso, eta l., 980–mn diode–pumped Er–doped fiber optical amplifiers with high gain–bandwidth product, *OFC® 91*, FA3, Feb. 22, 1991, p. 195.

Gary A. Ball, et al., *Tunable $Er^{3+}$ fiber laser utilizing intra-core Bragg reflectors*, OFC®91, FA4, Feb. 22, 1991, p. 196.

C.W. Hodgson, et al., Spectrally shaped high–power amplified spontaneous emission sources incorporating long–period gratings, *OFC '96 Technical Digest*, Feb. 27, 1996, TuG3, pp. 29–30.

*Primary Examiner*—Leon Scott, Jr.
*Attorney, Agent, or Firm*—Knobbe, Martens, Olson & Bear, LLP

[57] ABSTRACT

Fiber-amplified spontaneous emission sources incorporating spectral filters show an improvement in mean wavelength stability versus a number of operating factors, including pump wavelength, pump power, feedback, and temperature. By adjusting the spectral characteristics of the filter, the position of the filter along the length of the fiber, and the length of the rare-earth doped fiber, a stable ASE source is designed so as to provide stable operating points for the mean wavelength versus desired operating parameters. In many cases the sources show an improvement in mean wavelength stability by an order of magnitude or more over present sources.

34 Claims, 12 Drawing Sheets

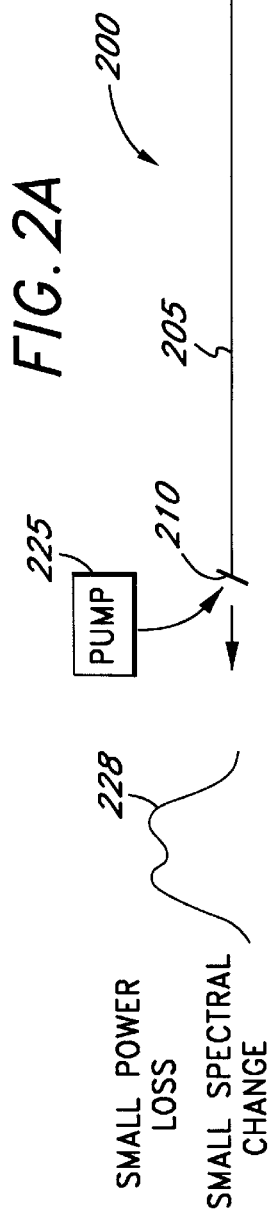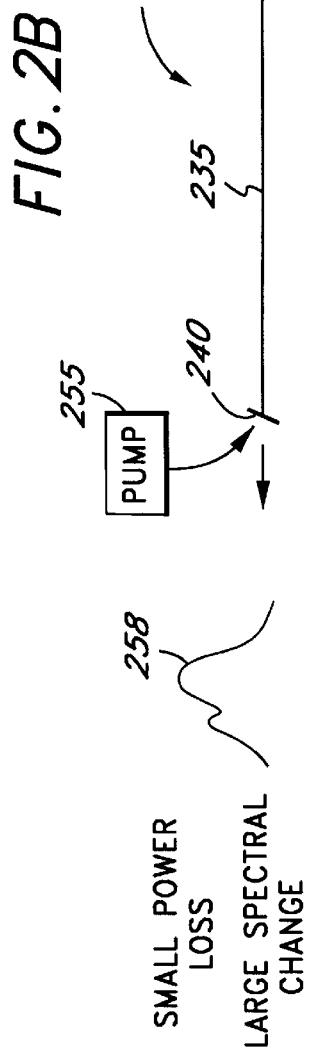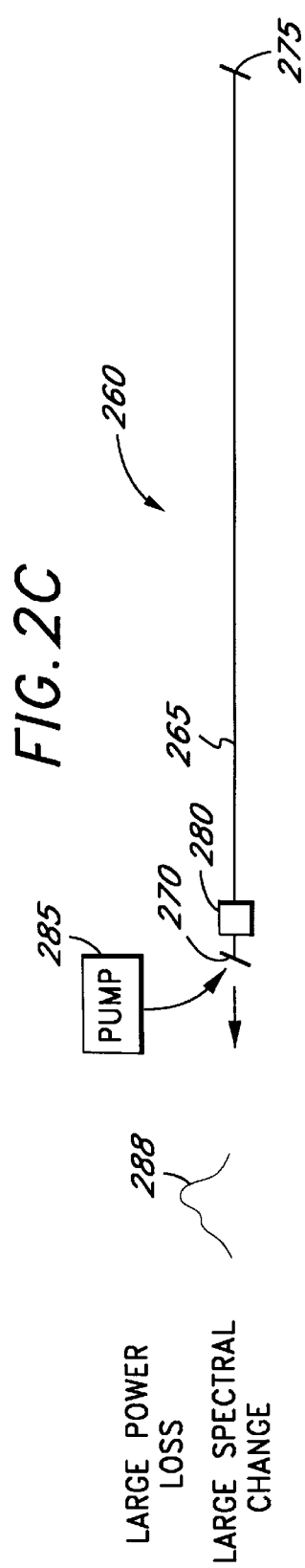

STABLE FIBER ASE SOURCES INCORPORATING SPECTRAL FILTERING

BACKGROUND OF THE INVENTION

1. Field of the Invention

The present invention relates to fiber amplified spontaneous emission (ASE) light sources.

2. Description of the Related Art

Fiber ASE light sources are well known in the art. ASE sources have been advantageously used to provide wideband (e.g., on the order of 10 to 30 nanometers), single spatial mode light beams for multiple applications. For example, ASE sources have been used to provide laser light as an input to a fiberoptic gyroscope. For a description of an exemplary superfluorescent fiber source, see an article entitled "Amplification of Spontaneous Emission in Erbium-Doped Single-Mode Fibers" by Emmanuel Desurvire and J. R. Simpson, published by IEEE, in "Journal of Lightwave Technology," Vol. 7, No. 5, May 1989.

An ASE light source typically comprises a length of single-mode fiber, with a core doped with an ionic, trivalent rare-earth element. For example, neodymium ($Nd^{3+}$) and erbium ($Er^{3+}$) are rare-earth elements that may be used to dope the core of a single-mode fiber so that the core acts as a laser medium.

The fiber receives a pump input signal at one end. The pump signal is typically a laser signal having a specific wavelength $\lambda_p$. The ions within the fiber core absorb the input laser radiation at wavelength $\lambda_p$ so that electrons in the outer shells of these ions are excited to a higher energy state of the ions. When a sufficient pump power is input into the end of the fiber, a population inversion is created (i.e., more electrons within the ions are in the excited state than are in the ground state), and a significant amount of fluorescence is caused along the length of the fiber. As is well known, the fluorescence (i.e., the emission of photons at a different wavelength $\lambda_s$) is due to the spontaneous return of electrons from the excited state to the ground state so that a photon at a wavelength $\lambda_s$ is emitted during the transition from the excited state to the ground state. The light which is emitted at the wavelength $\lambda_s$ from the fiber is highly directional light, as in conventional laser light. However, one main characteristic of this emission which makes it different from that of a traditional laser (i.e., one which incorporates an optical resonator) is that the spectral content of the light emitted from the superfluorescent fiber source is generally very broad (between 10 and 30 nanometers). Thus, the optical signal output by the fiber will typically be at a wavelength $\lambda_s \pm 15$ nanometers. This principle is well known in laser physics, and has been studied experimentally and theoretically in neodymium-doped and erbium-doped fibers, and in fibers doped with other rare-earths, for several years.

Light emitted from ASE fiber sources has multiple applications. For example, in one application, the output of the ASE source is fed into a fiberoptic gyroscope. For reasons that are well understood by those skilled in the art, the fiberoptic gyroscope should be operated with a broadband source which is highly stable. Of the several types of broadband sources known to exist, superfluorescent fiber sources, in particular, made with erbium-doped fiber, have thus far been the only optical sources which meet the stringent requirements for inertial navigation grade fiberoptic gyroscopes. The broad bandwidth of light produced by erbium-doped fiber sources, together with the low pump power requirements and excellent wavelength stability of erbium-doped fiber sources, are the primary reasons for use of such sources with fiberoptic gyroscopes.

In an erbium-doped fiber, the emission of a superfluorescent fiber source is bi-directional. That is, the light which is emitted by the return of electrons to the ground state in the erbium ions is typically emitted out of both ends of the fiber. As described in U.S. Pat. No. 5,185,749, to Kalman, et al., for erbium fibers of sufficient length, the light propagated in the backwards direction (i.e., in the direction opposite that in which the pump signal propagates), has a very high quantum efficiency. Thus, it is advantageous to implement erbium sources so that the light emitted from the ASE erbium-doped source is emitted from the pump input end of the fiber (i.e., in the backward propagation direction).

An ASE source is generally implemented in one of two configurations. In a first configuration, called a single-pass ASE source, the superfluorescent source output power is emitted in two directions, one of which is not used. In the second configuration, called a double-pass ASE source, a reflector is placed at one end of the fiber to reflect the superfluorescent source signal so that the superfluorescent signal is sent a second time through the fiber. Since the fiber exhibits gain at the signal wavelength, the signal is amplified. One advantage of the double-pass configuration is that it produces a stronger signal. A double-pass ASE source configuration also produces output only at one port (i.e., in one direction). A disadvantage with such a configuration is that the feedback must be kept very low in order to prevent lasing (e.g., with use of an optical isolator).

For fiberoptic gyroscope applications, one critical measure of source performance is the stability of the source mean wavelength (for example, see U.S. Pat. No. 5,355,216 to Kim, et al.). As is well known in the art, stability of the source mean wavelength leads directly to the stability of the sensor scale factor error. The scale factor error is critical in determining an accurate measurement of the rotation of the gyroscope to precise values. Presently, sources exist which have a mean wavelength stability down to a few parts per million, assuming reasonable stabilization of system parameters such as pump wavelength, pump power, temperature, feedback, etc. However, a stability of less than one part per million in mean wavelength is desirable for some applications.

SUMMARY OF THE INVENTION

One aspect of the present invention is a stable, amplified spontaneous emission (ASE) source which comprises an optically propagating fiber doped with a rare-earth element. A pump light source injects optical energy into the fiber to stimulate emission of an optical signal from the fiber. The optical signal has a spectral shape and a mean wavelength. A spectral filter is placed at a position along the fiber to modify the spectral shape of the optical signal in order to stabilize the mean wavelength of the optical signal with respect to an operating parameter. In one embodiment, the operating parameter is pump wavelength. Alternatively, the operating parameter is pump power. In a further alternative, the operating parameter is feedback. In a further alternative, the operating parameter is temperature.

Another aspect of the present invention is a method for generating a stable amplified spontaneous emission. The method comprises the step of injecting pump light from a pump light source into an optical fiber doped with a rare-earth element. The pump light propagates in the fiber and stimulates emission of an optical signal from the fiber. The optical signal has a spectral shape and a mean wavelength. The method also comprises the step of modifying the spectral shape of the optical signal using a spectral filter positioned at a location along the fiber to thereby stabilize the mean wavelength of the optical fiber with respect to an operating parameter. In one embodiment, the operating parameter is pump wavelength. Alternatively, the operating parameter is pump power. In a further alternative, the operating parameter is feedback. In a further alternative, the operating parameter is temperature.

BRIEF DESCRIPTION OF THE DRAWINGS

FIG. 2A illustrates the effects of placing a spectral filter near the far end of an ASE source.

FIG. 2B illustrates the effects of placing a spectral filter near the middle of an ASE source.

FIG. 2C, illustrates the effects of placing a spectral filter near the input of an ASE source.

FIG. 3, comprising

DETAILED DESCRIPTION OF THE PREFERRED EMBODIMENT

In accordance with the preferred embodiment of the present invention, an ASE source which achieves a stability of less than one part per million in mean wavelength versus critical system parameters is provided. To obtain a measure of stability in parts per million, the slope of the curve relating the operating parameter to mean wavelength is normalized (i.e., divided by the quantity measuring the parameter operating point at which stability is to be measured), and multiplied by one million. This new source incorporates an all-fiber spectral filter which acts to stabilize the ASE source. In one preferred embodiment, the spectral filter is a fiber, long-period grating. Long-period gratings selectively couple light from the main transmission mode of a fiber to a cladding mode of the fiber. These gratings are highly wavelength dependent, and thus can be used as spectral filters.

By adjusting the filter characteristics as well as the length of the ASE fiber and the position of the filter along the fiber, stable mean-wavelength operating points are found relative to pump power and feedback (e.g., from a fiber gyro). Increased mean-wavelength stability is also achieved versus pump wavelength. In accordance with the preferred embodiment of the invention, these stable points can be set to correspond to reasonable operating points (e.g., a reasonable pump power, a reasonable pump wavelength, a reasonable feedback level, etc.).

Figure 1:
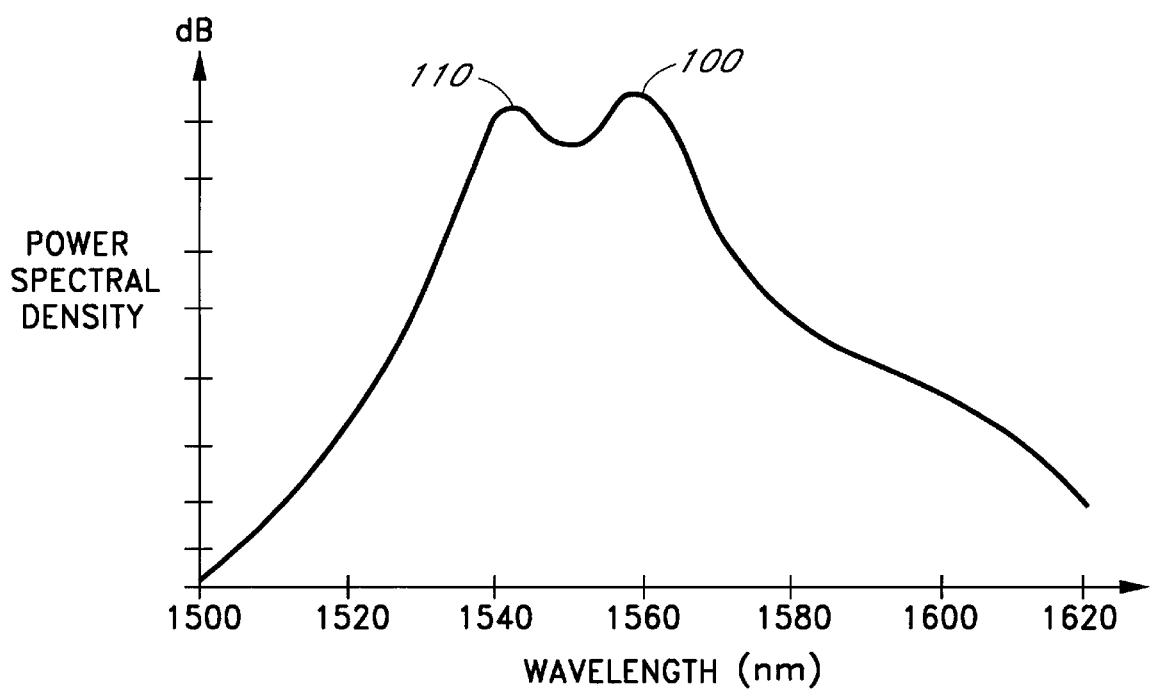
FIG. 1 graphically shows the power spectral density of the light emitted from a conventional ASE source versus the wavelength of the emitted light.

FIGS. 1 and 3 illustrate the methodology of the preferred embodiment used to stabilize the mean wavelength of the output signal by adjusting the filter characteristics, while FIGS. 2A–2C illustrate the results of adjusting the position of the filter along the length of the ASE fiber.

FIG. 1 illustrates a plot of power spectral density versus wavelength for a typical ASE, erbium-doped fiber source. As can be seen from the plot of FIG. 1, the power spectral density of the light emitted from this source has two prominent peaks. A first peak 100 occurs at about 1560 nanometers, while a second peak 110 occurs at approximately 1535 nanometers. It has been found that an ASE erbium-doped fiber source having output signal characteristics such as those depicted in FIG. 1, is fairly stable within a few parts per million of the mean wavelength (e.g., $\lambda_s \pm \lambda_s \cdot 3 \cdot 10^{-6}$). However, mean wavelength stabilities less than a few parts per million have been heretofore unobtainable with sources bearing these spectral characteristics.

The inventors of the present invention have recognized that by de-emphasizing one of the peaks (i.e., either the peak at 1535 nanometers or the peak at 1560 nanometers) in the erbium-doped ASE output signal, the stability of the mean wavelength for the output signal can be significantly improved (e.g., on the order of ten times the stability of previous sources). One possible reason for this increase in stability is that by de-emphasizing one of the peaks (preferably the peak at 1535 nanometers), the peaks 100, 110 do not "compete" with one another. That is, photons generated within and amplified by the ASE fiber naturally tend to be emitted near one of the two peaks 100, 110. Variations in critical operating parameters could bias photons to be emitted nearer to one peak rather than the other, so that a shift in the power spectral density from one of the peaks to the other of the peaks is observed. This shift destabilizes the mean wavelength of the output signal. Thus, by de-emphasizing one of the peaks 100, 110, only a single peak remains. In a single peak spectral distribution, no significant shift in power spectral density from one peak to another peak occurs. Thus, when one of the peaks 100, 110 is de-emphasized, the majority of photons remain stable around the remaining, single peak.

Figure 3A:
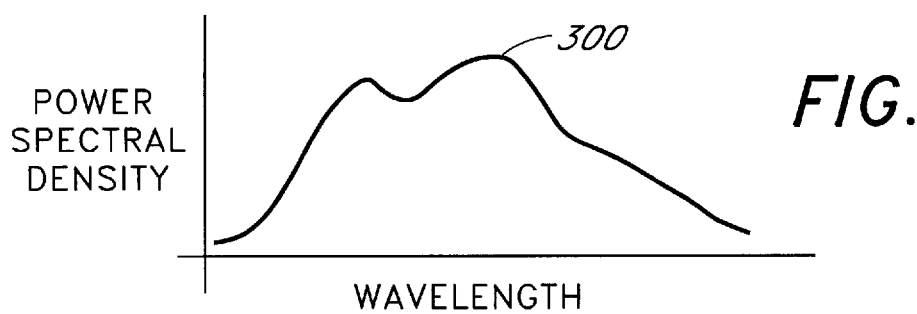
FIGS. 3A, 3B, and 3C, illustrates the manner in which the characteristics of the spectral filter are used to modify the spectral density characteristics of the signal output by the ASE source.
Figure 3B:
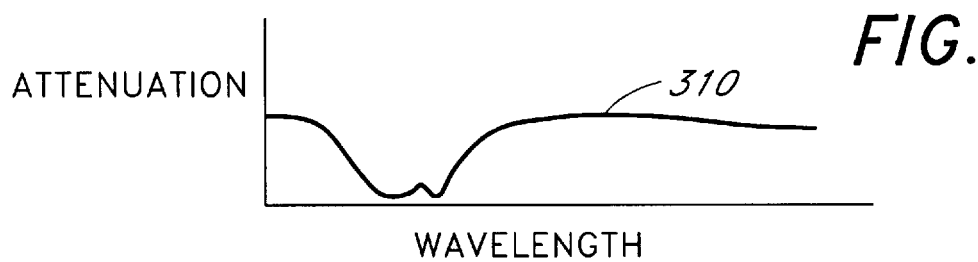
Figure 3C:
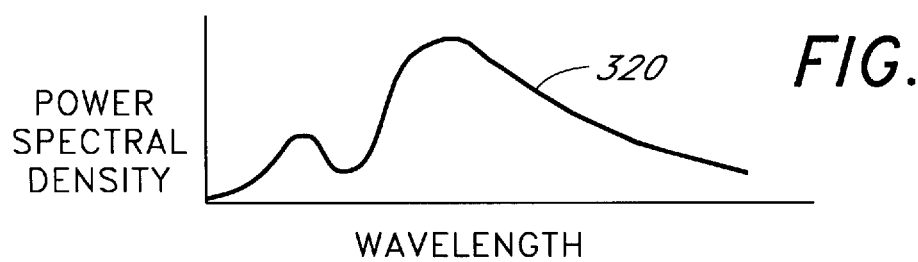

FIGS. 3A, 3B, and 3C depict one method by which the peak at 1535 nanometers is de-emphasized using a notch filter to arrive at a more stable ASE source output. A first curve 300 depicts the output of the ASE source prior to filtering. The curve 300 is substantially similar to the curve depicted in FIG. 1. A curve 310 represents the spectral characteristics of a notch filter provided at some point along the length of the fiber ASE source. Note that the Y-axis represents attenuation in negative decibels. That is, more attenuation is represented by a smaller displacement along the Y-axis. (See FIG. 9.) The precise spectral shape of the curve 310 may vary from application to application, however, one exemplary spectral shape is precisely defined and described with reference to FIG. 9. The resulting spectral output of the ASE fiber source (as modified by the notch filter) is represented by a curve 320 in FIG. 3C. It should be noted from FIGS. 3B and 3C that the curve 320 has one main peak at 1560 nanometers, while the peak at 1535 nanometers has been significantly attenuated by the notch filter 310.

FIGS. 2A–2C schematically illustrate the result achieved in the spectral output of an ASE fiber source when a spectral filter is placed at various locations along the length of the ASE fiber source. In a first case, depicted in FIG. 2A, an ASE source 200, comprising a fiber 205 with ends 210, 215, includes a spectral filter 220 near the end 215 of the fiber 205. Pump light is input from a pump source 225 into the end 210 of the fiber opposite the location of the spectral filter 220. Since the ASE fiber source 200 comprises erbium-doped fiber of sufficient length to utilize the high quantum efficiency of the backward propagating signal, the majority of the signal output by the ASE fiber source 200 is provided from the pump input end 210 of the fiber 205.

Spectral density plotted versus wavelength of the output from the ASE source 200 is represented by a curve 228 in FIG. 2A. As can be seen from the characteristics of the curve 228, the signal output from the ASE fiber source 200 exhibits a small power loss, as well as a small spectral change. That is, the curve 228 has substantially the same spectral characteristics as the curve of FIG. 1 and the curve 300 of FIG. 3, where prominent peaks are observed at both the 1535 nanometer and 1560 nanometer wavelengths. Thus, it can be seen from FIG. 2 that positioning the spectral filter 220 towards the end 215 of the fiber 205 does not result in a substantial improvement in the stability of the output signal from the ASE source 200.

FIG. 2C shows an ASE source 260 which comprises a fiber 265 with ends 270, 275, and which includes a spectral filter 280 near the end 270 of the fiber 265. Pump light is input from a pump source 285 into the end 270 of the fiber proximate to the location of the spectral filter 280. Since the ASE fiber source 260 comprises erbium-doped fiber of sufficient length to utilize the high quantum efficiency of the backward propagating signal, the majority of the signal output by the ASE fiber source 260 is provided from the pump input end 270 of the fiber 265.

A curve 288 in FIG. 2C represents the power spectral density plotted versus the wavelength of the output signal from the ASE fiber source 260. As can be seen from the characteristics of the curve 288, although the spectral output of the ASE source 260 is significantly changed to de-emphasize the peak at the 1535 nanometer wavelength, the overall power in the output signal is also significantly reduced, due to the placement of the spectral filter 280 near the pump input end 270 of the fiber 265. Thus, the stability advantages associated with a significant spectral change are offset by the significant reduction in power of the output signal.

FIG. 2B schematically illustrates an ASE fiber source 230 which comprises a fiber 235 with ends 240, 245, and which includes a spectral filter 250 proximate to the middle of the fiber 235. Pump light is input from a pump source 255 into the end 240 of the fiber 235. Since the ASE fiber source 230 comprises erbium-doped fiber of sufficient length to utilize the high quantum efficiency of the backward propagating signal, the majority of the signal output by the ASE fiber source 230 is provided from the pump input end 240 of the fiber 235.

A curve 258 represents the power spectral density of the signal output from the ASE source 230 plotted versus the wavelength. As can be seen from the curve 258 of FIG. 2, the output of the ASE source 230 having the spectral filter 250 placed towards the center of the fiber 235 exhibits a significant spectral change without a significant power loss in the output signal. Thus, the peak at 1535 nanometers is greatly attenuated, while the overall power of the output signal remains nearly the same. Thus, the ASE fiber source 230 having the spectral filter 250 located towards the center of the fiber 235 is highly advantageous for purposes of stabilizing the mean wavelength of the output from the ASE fiber source 230.

The reason for the small power loss in the embodiment where the spectral filter 250 is placed towards the center of the fiber 235 is that light near the 1535 nanometer wavelength peak is attenuated and thus never saturates the gain in the fiber 235 after the filter 250, and allows light near the 1560 nanometer wavelength peak to experience larger gain. That is, fewer of the ions are stimulated to emit light near the 1535 nanometer peak—instead, more ions are stimulated to emit light near the 1560 nanometer peak after the filter 250 in the fiber 235. That is, the population inversion is not depleted as greatly by the attenuated light near the 1535 nanometer peak as when the light in the 1535 nanometer wavelength peak is unfiltered and not attenuated, so that more ions are available to generate photons near the 1560 nanometer wavelength peak. Thus, in accordance with a preferred embodiment of the invention, the output signal provided at the end 240 of the ASE fiber source 230 is amplified more strongly near the 1560 nanometer wavelength, and is attenuated near the 1535 nanometer wavelength. It should be noted that a similar behavior applies for the forward propagation signal (not shown for simplicity in illustrating the preferred embodiment). This illustrates a key concept of the preferred embodiment. Namely, attenuating one of the wavelengths peaks with a spectral filter reduces the power near that wavelength peak, but also increases the gain (and thus the power) available at the other wavelength peak.

It will be appreciated that the optimum position of the spectral filter 250 is a function of several parameters. For instance, the stability of the mean wavelength versus feedback level is very sensitive to the filter position. As the filter 250 is moved towards the pump end 240 of the fiber 235, the feedback level that exhibits a stable operating point increases. If the filter is too close to the fiber end 240, no stable operating point versus feedback level exists. This is one way to pick the appropriate location of the filter. At the same time, moving the filter 250 towards the pump end 240 of the fiber 235 can decrease the stability of the mean wavelength due to pump power fluctuations at low pump powers (10 to 20 mW for a total fiber small signal attenuation of 240 dB). In practice, the position of the filter 250 should be between the 30 dB and 120 dB small-signal attenuation points of the fiber 235; however, certain applications may call for placing the filter 250 between the 0 dB and 200 dB small-signal attenuation points of the fiber 235.

In order to determine the so-called small signal attenuation characteristics of the fiber 235, a number of techniques may be used. One technique is to transmit a low-power, optical signal into an end of the fiber. It is advantageous if the wavelength of this test signal is near the pump absorption or the signal absorption bands (the results discussed herein are based upon a test signal at the emission wavelength for erbium: 1.53 micrometers). During this test phase, the low-power test signal is the only signal propagating through the fiber (i.e., no pump signal is introduced into the fiber). Furthermore, the power of the signal should be low enough to ensure that the signal is non-saturating (i.e., so that there is virtually no population inversion).

For erbium-doped fibers, it has been found that the attenuation for small signals is directly proportional to the length of the fiber so that one need only measure the attenuation after one meter. For example, if the attenuation at the test signal wavelength is 3 dB/meter, then 100 meters of fiber would define the 300 dB length of fiber.

It should be noted here that, although the test signal may be greatly attenuated along the selected length of fiber, in practice, the pump signal at normal operating power (around 20 mW) will not normally be attenuated to the same degree as the test signal along the same length of fiber. This is because the pump signal carries more power and will tend to saturate the fiber in the regions towards the pump input so that the actual attenuation of the pump signal at the end of the fiber may only be on the order of 25 or 30 dB. Pump signals at this attenuation are still significant as far as the emitted signal light at $\lambda_s$ is concerned since the fiber will typically exhibit 20–40 dB of gain for photons emitted at the far end of the fiber. Thus, even though a fiber is long enough to produce, for example, 300 dB of attenuation for the test signal, lengths significantly shorter than this length could affect the positioning of the filter 250 due to effects associated with pump powers much higher than the test signal power.

According to this method of locating the optimum position of the filter 250, a fixed, small-signal attenuation point (i.e., a point measured using the attenuation of a low-power test signal) is designated as the optimum point for all fibers beyond a sufficient length.

In one preferred embodiment, a single-mode fiber of 77 meters, with a small-signal attenuation of 3 dB/meter (at 1530 nm), includes a filter positioned at the 36.75 dB point (i.e., 12.25 meters from the output). The spectral characteristics of the filter correspond to those represented in FIG. 9. For this fiber, the modeled stable operating point for optimum pump power is approximately 15 mW, the modeled stable operating point for optimum feedback is approximately –20 dB, and the modeled stable operating point for the optimum pump wavelength is approximately 1470 nanometers. Each of these operating points is a reasonable operating point for most ASE source applications. The core diameter of the modeled fiber was 3–4 microns. In experimental results, when such a fiber is employed as an ASE source, the stability of such a source over conventional sources is greatly increased.

Figure 4A:
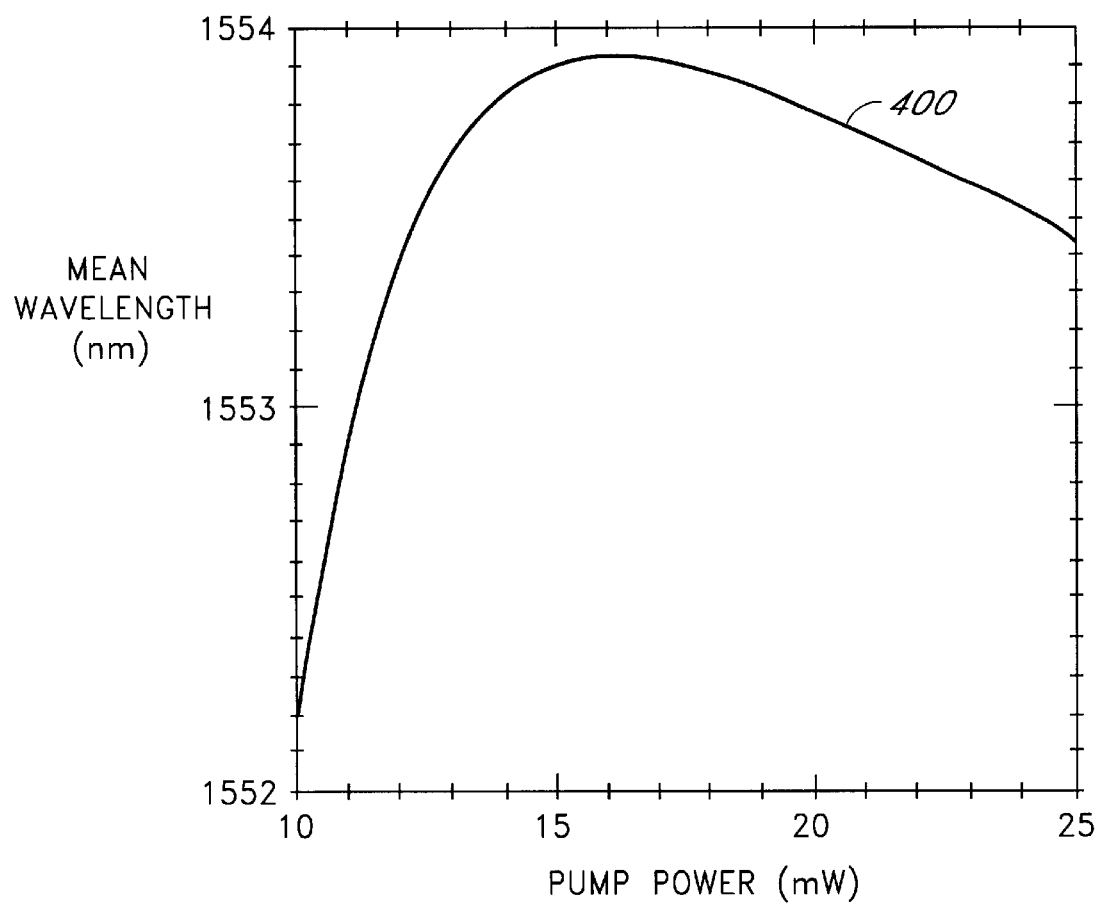
FIGS. 4A and 4B graphically represent the stability characteristics for the mean output wavelength plotted versus pump power where no spectral filter is used (4A) and where a spectral filter having characteristics in accordance with the preferred embodiment is used (4B).
Figure 4B:
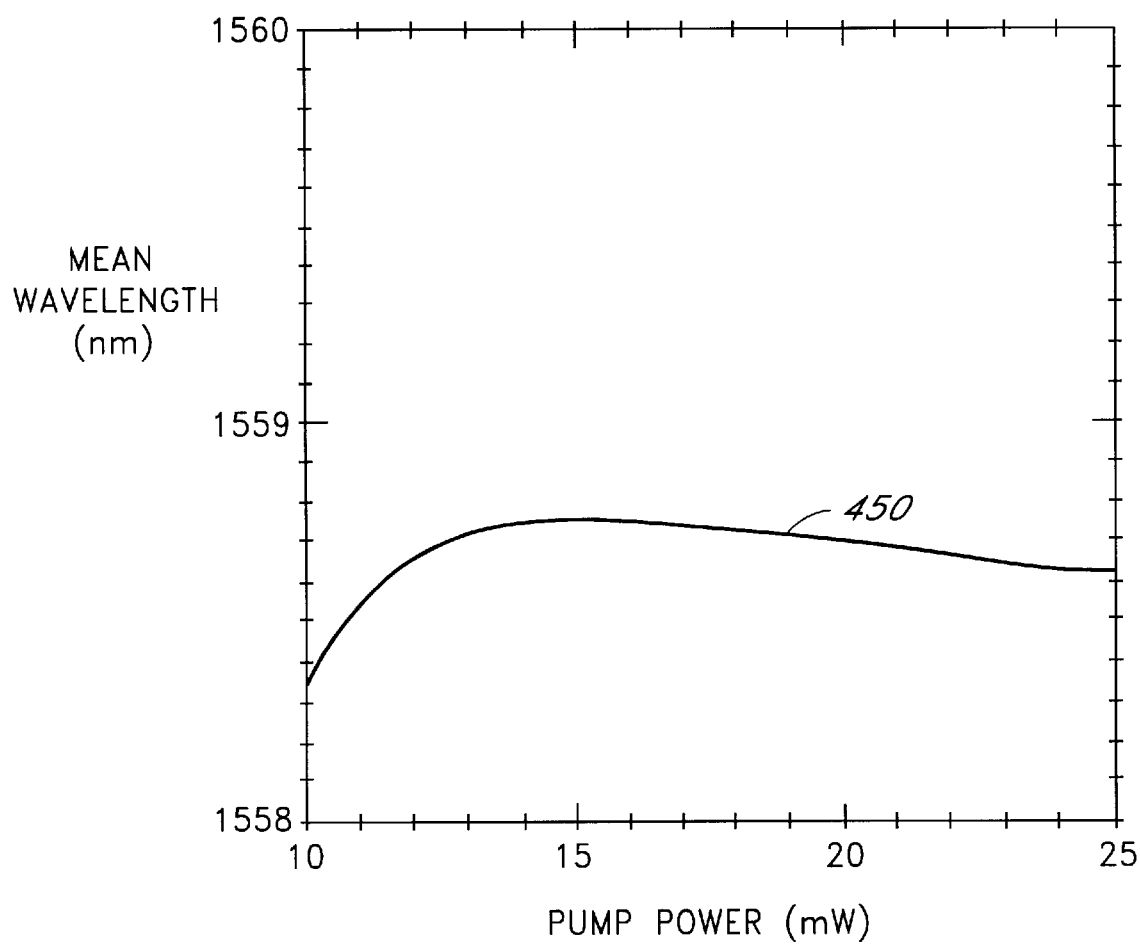

FIGS. 4A and 4B illustrate the advantages obtainable by the preferred embodiment of the invention by increasing mean wavelength stability versus pump power. As shown in FIG. 4A, a curve 400 represents the variation in mean wavelength (measured in nanometers) versus pump power (measured in units of milliwatts). The curve 400 represents the variation observed in mean wavelength when a spectral filter is not placed within the ASE fiber source (so that the output spectrum is essentially unfiltered, as depicted in FIG. 1). As can be seen from the curve 400 of FIG. 4A, a variation of 5 milliwatts in pump power can result in a variation in mean wavelength of nearly 0.1 nanometers, even near the stable operating point of the unfiltered ASE source. Moreover, the slope of the tangent to the curve 400 of the pump power at the 15 milliwatt operating point corresponds to a stability of 13 parts per million per milliwatt.

In accordance with the preferred embodiment of the invention, however, by interposing a spectral filter having the appropriate characteristics at the appropriate position along the fiber 235, the stability of the mean wavelength versus pump power can be greatly enhanced. For example, a curve 450 shown in FIG. 4B represents the variation in mean wavelength versus pump power in the fiber source 230 wherein the spectral filter 250 is appropriately placed along the length of the fiber 235 (e.g., at the 36.75 dB point). As can be seen from FIG. 4B, a variation in pump power of about 5 milliwatts about the stable point of the curve 450 results in a variation in mean wavelength which is significantly less than 0.1 nanometers. Thus, by interposing the spectral filter 250 into the source 230, an equivalent variation in pump power results in a significantly reduced variation in mean wavelength.

In addition to the increased stability obtainable by means of the present invention, it will also be appreciated that the operating point at which the stable mean wavelength point occurs can be varied by varying certain system design parameters. This is in contrast with conventional unfiltered sources wherein a single stable operating point exists which may or may not occur at a reasonable operating point. For example, if a stable operating point occurs at a pump power of 100 mW, this stable point is not useful in most applications since this pump power is prohibitively high. For the case of determining the stable point for the mean wavelength versus pump power, changing the overall length of the fiber 235 results in an adjustment of the stable operating point so that the desired stable point can be set by adjusting the fiber length. For example, for the embodiment described herein, an increase in the fiber length results in an increase of the power level at which the stable operating point occurs.

In like manner, the stable point for the mean wavelength versus pump wavelength can be adjusted by varying the shape of the filter spectrum, while the stable operating point for the mean wavelength versus the feedback level can be adjusted by varying the filter position along the length of the fiber 235. Temperature stability can also be adjusted by varying the shape of the filter spectrum. For instance, in one embodiment, the filter characteristics are adjusted so that the deepest part of the notch is at a slightly higher wavelength than the peak at 1535 nanometers. Thus, when the filter 250 expands (thereby moving the notch to filter out higher wavelengths), the notched peak (i.e., at 1535 nm) grows. This acts to counterbalance the emphasized peak which also tends to shift to longer wavelengths when erbium expands in increased temperatures.

Figure 5A:
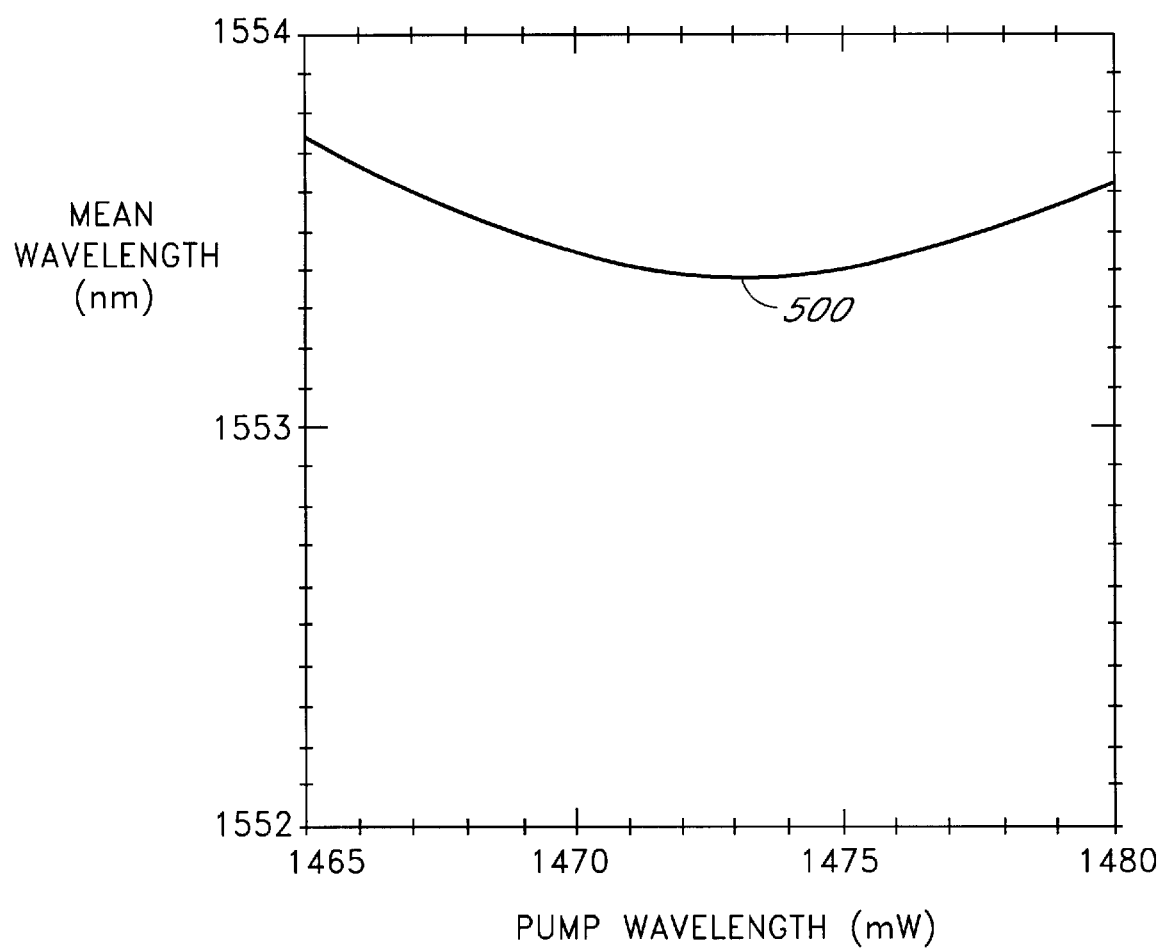
FIGS. 5A and 5B graphically represent the stability characteristics for the mean output wavelength plotted versus pump wavelength where no spectral filter is used (5A) and where a spectral filter having characteristics in accordance with the preferred embodiment is used (5B).
Figure 5B:
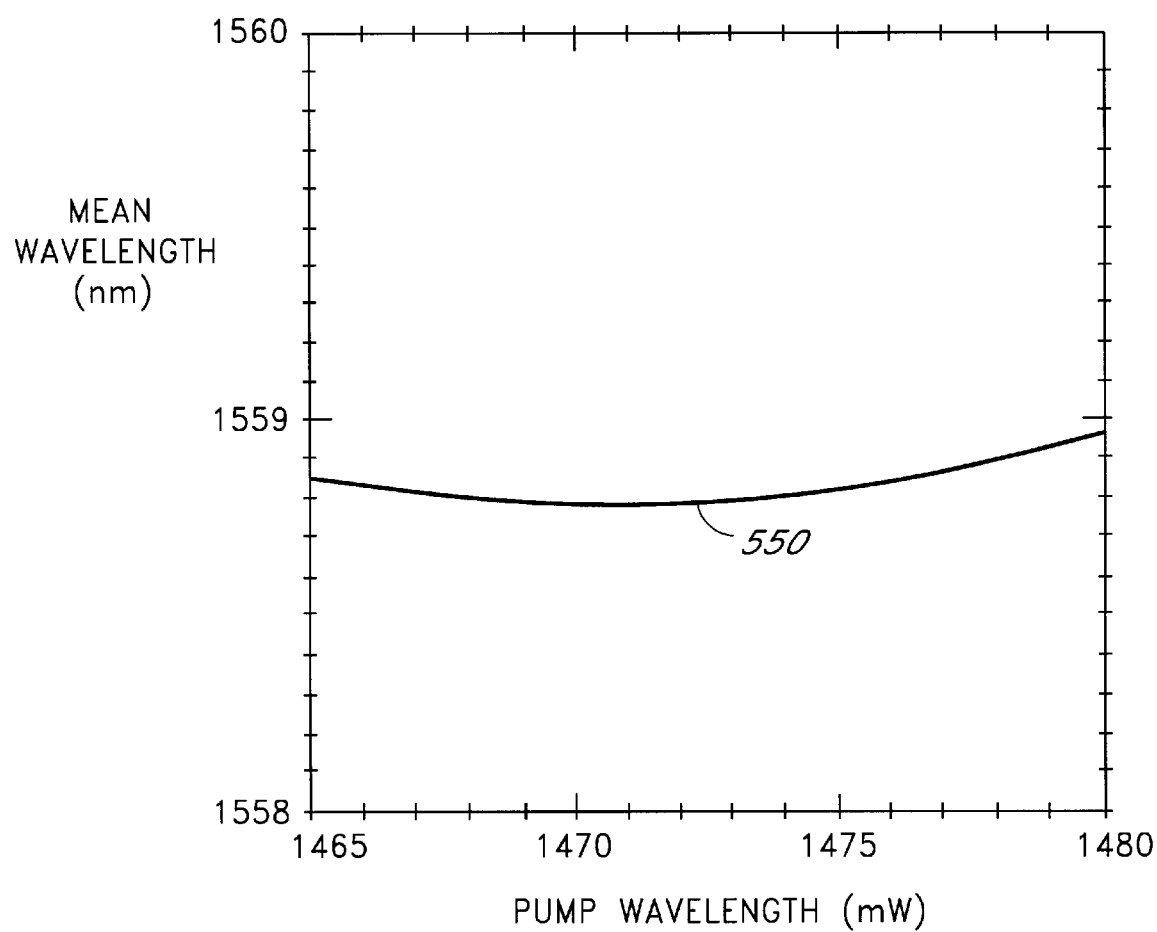

FIGS. 5A and 5B graphically illustrate the increase in mean wavelength stability versus pump wavelength achieved by introducing the spectral filter 250 into the ASE source 230. A first curve 500 depicted in FIG. 5A represents the variation in mean output signal wavelength plotted versus pump wavelength in the absence of the spectral filter 250. At an operating pump wavelength of 1470 nanometers, a pump wavelength variation of ±1 nanometer (i.e., from 1469 nanometers to 1471 nanometers) results in a variation in mean wavelength of approximately 0.07 nanometers (corresponding to approximately 23 parts per million per nanometer). A curve 550, shown in FIG. 5B, represents the variation in mean wavelength versus pump wavelength in the presence of the spectral filter 250. As shown in FIG. 5B, a variation in pump wavelength from 1469 nanometers to 1471 nanometers results in no net change of mean wavelength. This is because the pump wavelength of 1470 nanometers has been set (i.e., by modifying the filter spectrum appropriately) so that equal variations on either side of 1470 nanometers result in substantially no difference in mean wavelength. Of course, it will be appreciated that the variation between 1470 nanometers and 1471 nanometers results in some small variation of mean wavelength which is nearly negligible due to the flat shape of the curve around the 1470 nanometer point. Thus, it can be seen that by incorporating the spectral filter 250 having the appropriately determined spectral characteristics, an extremely high stability of mean wavelength versus pump wavelength is achieved.

Figure 6A:
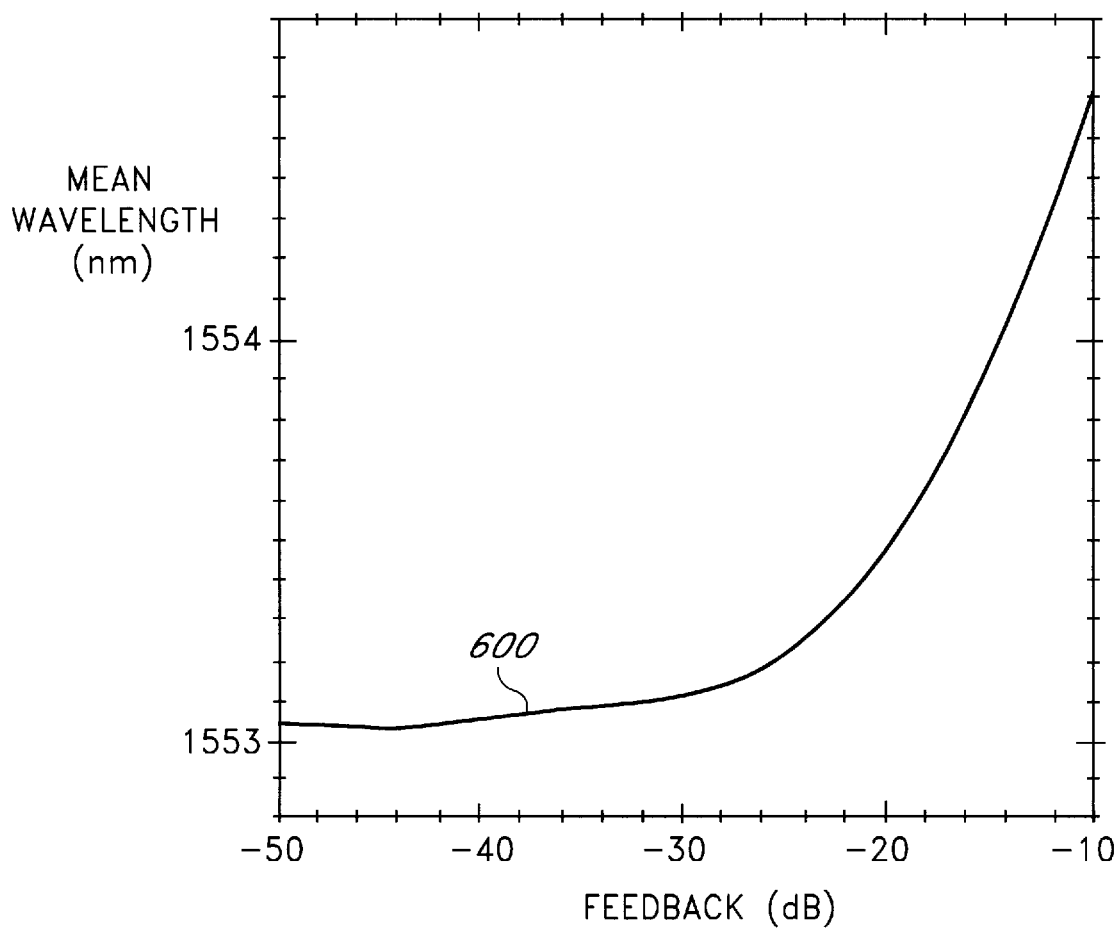
FIGS. 6A and 6B graphically represent the stability characteristics for the mean output wavelength plotted versus feedback where no spectral filter is used (6A) and where a spectral filter having characteristics in accordance with the preferred embodiment is used (6B).
Figure 6B:
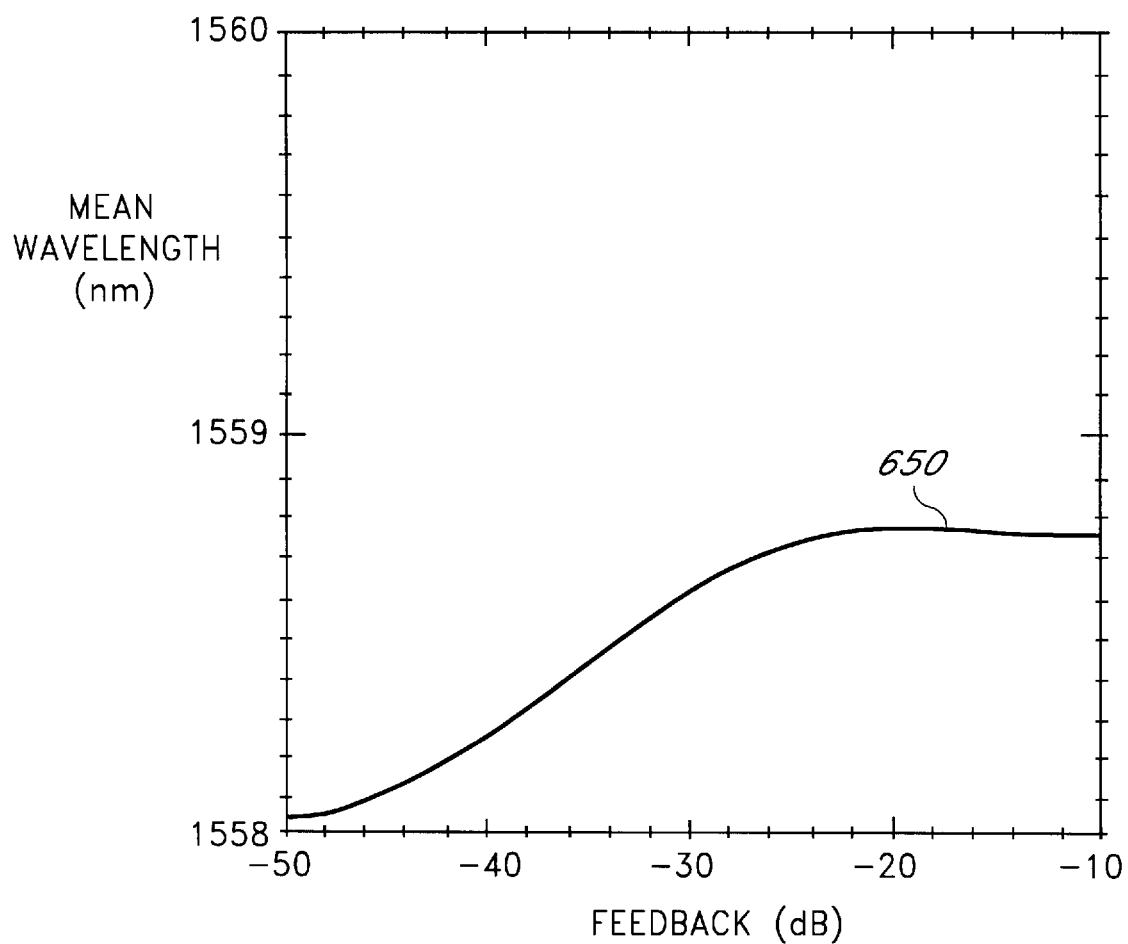

FIGS. 6A and 6B graphically illustrate the increase in mean wavelength stability versus the level of feedback achieved by interposing the spectral filter 250 along the length of the fiber 235. As shown in FIG. 6A, a curve 600 represents the variation in mean wavelength of the output signal versus the feedback level within the ASE source 230 due to the fiberoptic gyroscope or other optical device which produces feedback. At a preferred operating point of −20 decibels of feedback, a variation of ±5 decibels (i.e., from −25 decibels to −15 decibels) results in a mean wavelength variation ($\Delta\lambda$) of approximately 0.7 nanometers. Moreover, the slope of the tangent to the curve 600 at the −20 dB operating point corresponds to a stability of approximately 45 parts per million per decibel. A curve 650 in FIG. 6B represents the variation in mean wavelength versus feedback level when the filter 250 is interposed. As shown in FIG. 6B, a variation in feedback from −25 decibels to −15 decibels results in no net change of mean wavelength. This is because the −20 decibel point has been set (i.e., by modifying the position of the filter 250 along the length of the fiber 235 appropriately) so that equal variations on either side of −20 decibels results in substantially no difference in mean wavelength. Of course, it will be appreciated that the variation between −25 decibels and −20 decibels results in some small variation of mean wavelength which is nearly negligible due to the flat shape of the curve about the −20 decibel point. Thus, it can be seen that by incorporating the spectral filter 250 positioned at the appropriate position along the fiber 235, an extremely high stability of mean wavelength versus feedback is achieved.

The results depicted in FIGS. 4A, 4B, 5A, 5B, 6A, and 6B are based on a computer simulation which has been verified with actual experimentation to ensure the accuracy of the computer simulation. In one advantageous embodiment, the well known OASIX modeling algorithm available from Lucent Technologies can be used to perform the simulations required to arrive at an optimum fiber length, filter characteristic and filter position for a selected application. The increased stability results of this modeling and experimentation are depicted in Table I below.

TABLE I

STABILITY COMPARISON

|  | UNFILTERED | FILTERED |
| --- | --- | --- |
| Pump Power | 13 ppm/mW | 0 ppm/mW |
| Pump Wavelength | 23 ppm/nm | 0 ppm/nm |
| Feedback | 45 ppm/dB | 0 ppm/dB |

No computer simulation was performed for mean wavelength stability versus temperature; however, a qualitative analysis indicates that similar methods can be used to increase mean wavelength stability with respect to temperature by adjusting the spectral characteristics of the filter 250. In particular, as temperature increases, the expansion produced in the fiber 235 causes the long-period grating defining the filter to expand so that the spectral characteristics of the filter 250 change with respect to temperature. A corresponding change occurs in the spectral characteristics of the output signal provided by the ASE source 230, so that it is possible to set the filter characteristics such that the change in filter characteristics counterbalances the change in the spectral characteristics of the ASE source 230.

For example, one effect commonly observed as the temperature increases is the shifting of the peak 100 at approximately 1560 nanometers to a longer average wavelength, so that the mean wavelength tends to increase as temperature increases. However, if the filter is set appropriately, the shift in the filtering characteristics results in less attenuation of the de-emphasized peak 110. Thus, even though the wavelength of the peak 100 increases (shifts to the right), an increase in the intensity of the peak 110 results in a net mean wavelength which does not change. This effect is illustrated in FIG. 8.

Figure 8:
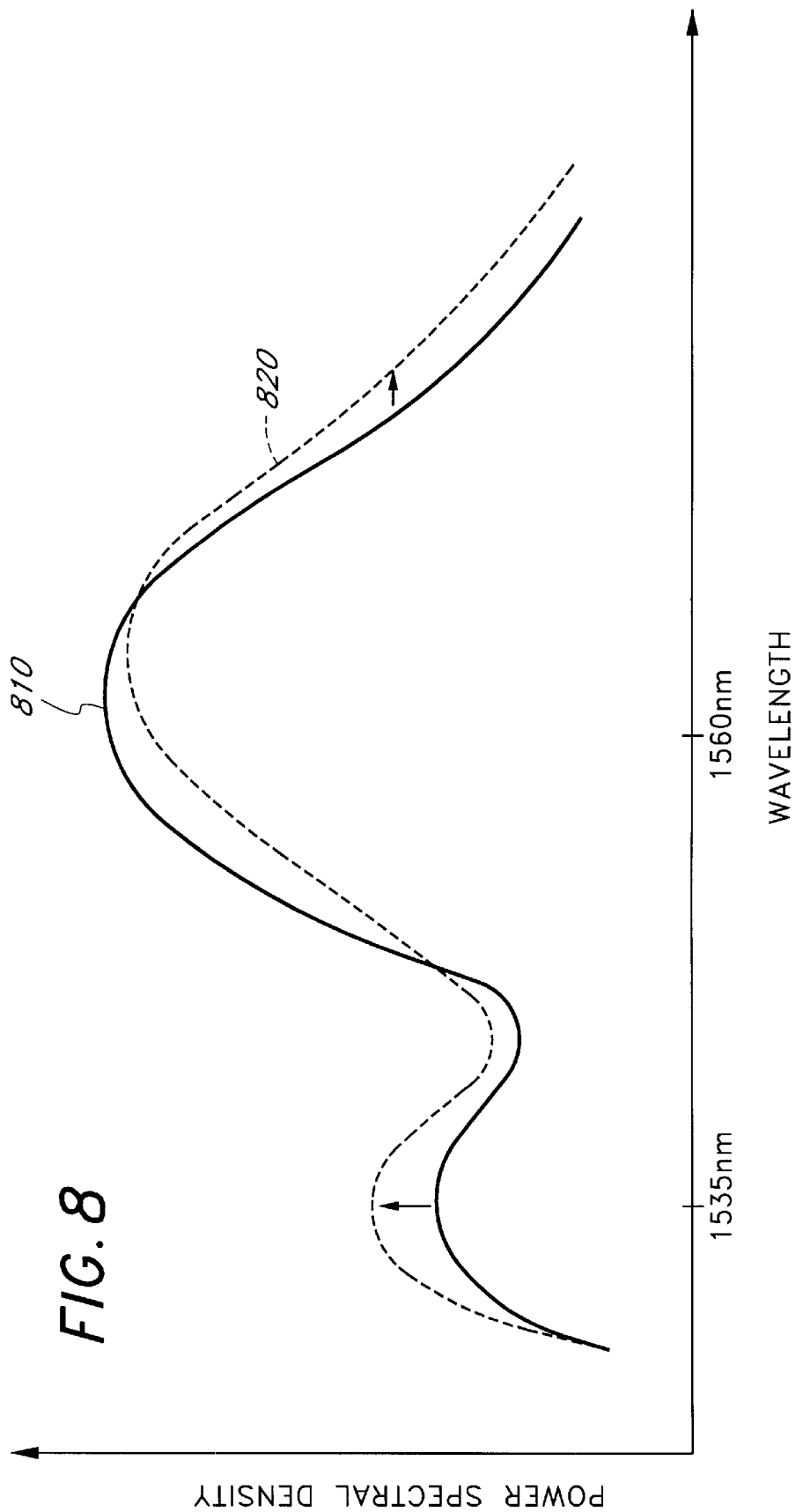
FIG. 8 illustrates the manner in which temperature compensation can be achieved by appropriate selection of filter characteristics.

As illustrated in FIG. 8, a curve 810 represents the spectral distribution of light output by an ASE source using the notch filter of the preferred embodiment. A curve 820 represents the spectral distribution for the same ASE source as temperature increases. As described above, when temperature increases, the filter grating expands together with the fiber. Thus, the filter can attenuate light at a longer wavelength. This allows the light at the 1535 nm hump to increase since the deepest part of the notch filter has been moved from the 1535 nm wavelength. At the same time, the 1560 nm peak moves to a longer wavelength so that the net effect is to balance the mean wavelength. By carefully selecting the spectral shape of the notch filter, the rate at which the 1535 nm peak grows can be controlled to precisely maintain the mean wavelength at a substantially constant value. The filter can be chosen with a particular temperature coefficient to offset the temperature coefficient of the erbium-doped fiber. See, for example, Justin Judkins, et al., "Temperature Insensitive Long-Period Fiber Gratings," *Optical Fiber Communications*, PD1-1. February 1996.

Figure 9:
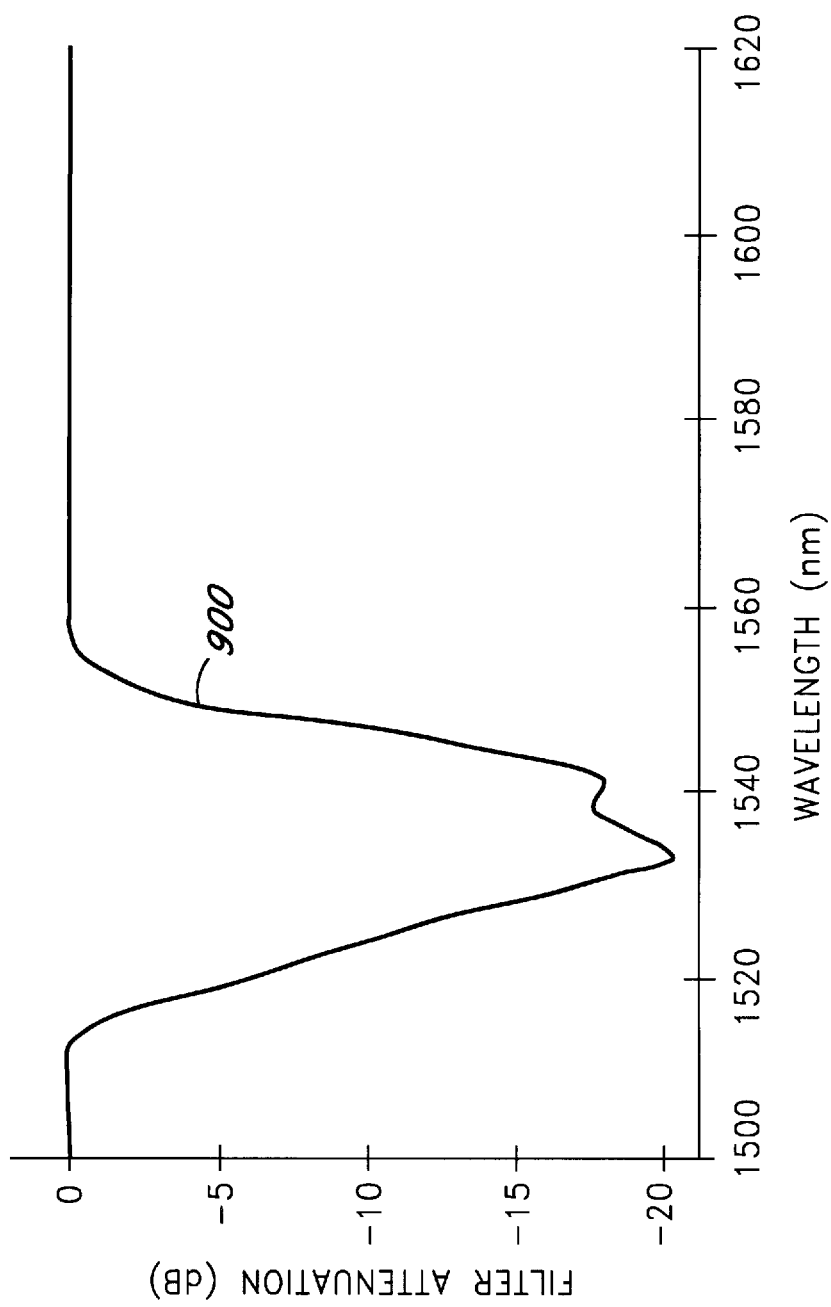
FIG. 9 illustrates a detailed plot of filter characteristics for a spectral filter used in one preferred embodiment of the invention.

FIG. 9 illustrates the spectral characteristics of the filter 250 in a particularly preferred embodiment of the invention. A curve 900 in FIG. 9 plots the relationship between filter attenuation (in units of decibels) versus wavelength (in units of nanometers). As can be seen from the curve 900 of FIG. 9, the maximum filter attenuation occurs at approximately 1533 nanometers, with an attenuation of −20 decibels. The bandwidth of the notch extends from approximately 1515 nanometers to 1555 nanometers, for a total bandwidth of 40 nanometers. A filter having spectral characteristics such as that depicted in FIG. 9 effectively de-emphasizes the peak 110 centered at about 1535 nanometers, but does not significantly attenuate the peak 100 at 1560 nanometers. Thus, the filter 250 having characteristics defined by the curve 900 produces a substantially one-peak output from the ASE source 230.

Figure 7A:
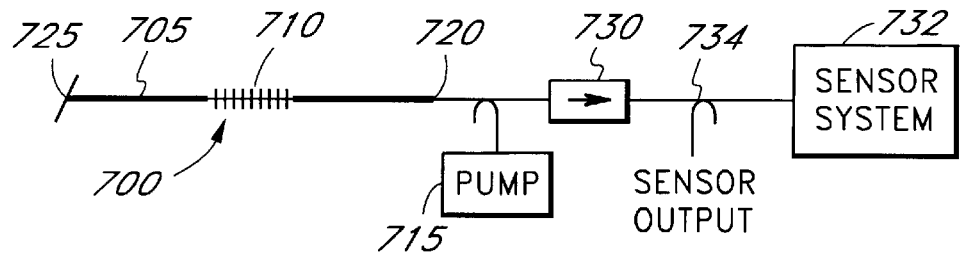
FIG. 7A schematically illustrates one embodiment of the invention wherein a single-pass configuration is used with an isolator between the ASE source and the fiberoptic gyro sensor system.
Figure 7B:
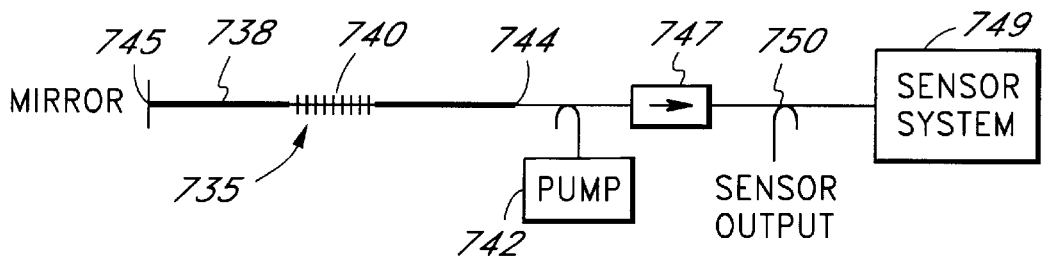
FIG. 7B schematically illustrates an embodiment of the invention wherein a double-pass ASE source configuration is used together with an isolator between the source and the fiberoptic gyro sensor system.
Figure 7C:
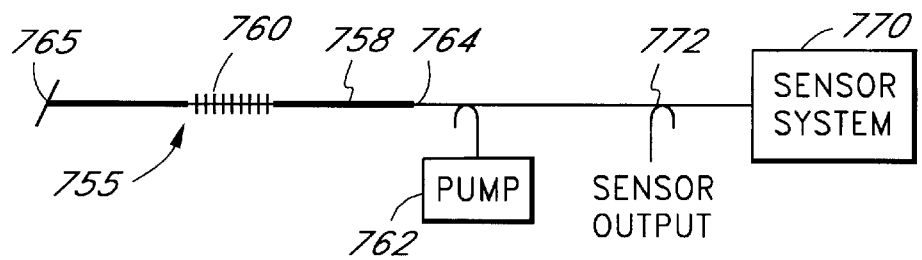
FIG. 7C schematically illustrates an embodiment of the invention wherein a single-pass configuration of the ASE source is used without the interposition of an isolator.
Figure 7D:
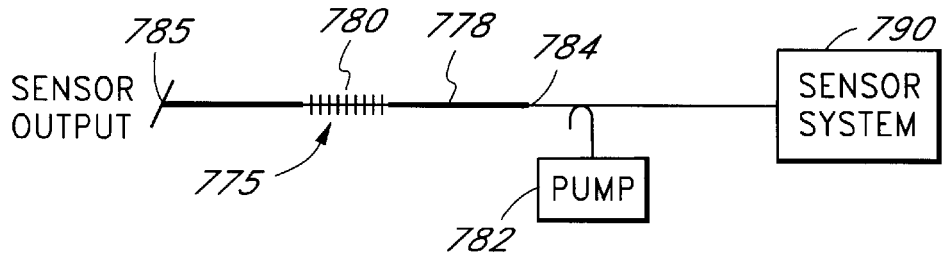
FIG. 7D schematically illustrates an embodiment of the invention wherein a single-pass ASE source provides an input to the fiberoptic gyro sensor system, and the sensor output is taken at the far end of the ASE source.

FIGS. 7A–7D illustrate four source configurations which can be improved by the addition of a spectral filter for source stabilization. FIG. 7A depicts a single-pass source configuration with an isolator; FIG. 7B depicts a double-pass configuration with an isolator; FIG. 7C illustrates a single-pass configuration without an isolator and with feedback from the sensor (e.g., the fiberoptic gyro coil); and FIG. 7D illustrates a fiber amplifier source (FAS). The FAS source depicted in FIG. 7D is the same as the single-pass source with feedback, except that the sensor feedback signal is amplified by the source to produce the sensor output signal.

More specifically, FIG. 7A depicts an ASE source 700 comprising an erbium-doped fiber 705 with a long-period grating 710 positioned within the fiber 705 as a spectral filter. A pump source 715 inputs pump light into the fiber 705 via an input end 720. A second end 725 of the fiber 705 is angle polished to be non-reflective so as to form a single-pass configuration of the ASE source 700. Light is amplified within the ASE source 700 in a backwards direction and emitted from the first end 720 of the fiber 705. The light passes through an isolator 730 and serves as an input to a fiberoptic gyroscope sensor system 732. The output of the fiberoptic gyroscope 732 is detected at a sensor output via a coupler 734. It should be appreciated that due to the presence of the isolator 730, the feedback level is significantly reduced so that it is typically not necessary to stabilize the mean wavelength with respect to this parameter. Thus, this configuration provides greater design flexibility than a configuration which does not employ an isolator.

FIG. 7B shows an ASE source 735 comprising an erbium-doped fiber 738 with a long-period grating 740 which acts as a spectral filter within the erbium-doped fiber 738. A pump source 742 couples pump light into the erbium fiber 738 via an input end or port 744. A second end 745 of the fiber 738 includes a mirror which reflects the signal light to form a double-pass configuration of the ASE source 735. Light is emitted from the ASE source 735 via the port 744 and passes through an isolator 747 to an input of a fiberoptic gyroscope sensor system 749. The output of the sensor system 749 is coupled to an output detector via a coupler 750. In one embodiment, the use of this configuration results in shallower notch filter requirements and the position of the filter 740 is moved away from the output end 744. It should be appreciated that due to the presence of the isolator 747, the feedback level is significantly reduced so that it is typically not necessary to stabilize the mean wavelength with respect to this parameter. Thus, this configuration provides greater design flexibility than a configuration which does not employ an isolator.

FIG. 7C schematically depicts an ASE source 755 comprising an erbium-doped fiber 758, having a long-period grating 760 positioned within the fiber 758 as a spectral filter. A pump source 762 injects light into the fiber 758 via an input port 764. A second end 765 of the fiber 758 is angle polished to be non-reflective so as to form a single-pass configuration of the ASE source 755. Light emitted in the backward propagation direction from the end 764 of the fiber 758 enters a fiberoptic gyro sensor system 770 without passing through an isolator. Thus, feedback from the fiberoptic gyroscope is typically experienced within the ASE source 755, and the spectral filter 760 aids in stabilizing the mean wavelength of the ASE source 755 with respect to the feedback from the sensor system. The sensor output is detected via a coupler 772, as depicted in FIG. 7C.

FIG. 7D schematically illustrates an ASE source 775 comprising an erbium-doped fiber 778 having a long-period grating 780 which serves as a spectral filter, positioned along the length of the fiber 778. A pump source 782 injects pump light into a first end 784 of the fiber 778. A second end 785 of the fiber 778 is angle polished to be non-reflective. Thus, the ASE source 775 is configured in a single-pass configuration. Light from the ASE source 775 is output in the backward propagation direction (i.e., from the end 784 of the fiber 778) to serve as an input to a fiberoptic gyro sensor system 790. The output from the sensor is taken from the end 785 of the ASE source 775 so that the ASE source 775 is configured as a FAS source so that light from the sensor system is amplified along the erbium-doped fiber 778. Of course, it will be appreciated that the light which is amplified from the sensor system 790 produces significant feedback, and the position and spectral characteristics of the filter 780 act to significantly stabilize the mean wavelength of the ASE source 775 in the presence of high feedback such as that experienced in an FAS configuration.

Although the preferred embodiments of the present invention have been described in detail above, it will be understood by those of ordinary skill in the art that certain obvious modifications and departures from the embodiments described herein can be made without departing from the spirit or essential characteristics of the invention. For example, rare-earth doped fibers of varying lengths and dopant concentration can be used within the ASE source. Furthermore, the spectral filter employed may comprise an other type of spectral filter than a long-period grating filter, which is formed in the fiber itself. Therefore, the scope of the present invention should be interpreted in light of the following appended claims.

What is claimed is:

1. A stable, amplified spontaneous emission (ASE) source comprising:

an optical fiber doped with a rare-earth element, said optical fiber having a length;

a pump light source which injects optical energy into said fiber to stimulate emission of an optical signal from said fiber, said optical signal having a spectral shape and a mean wavelength; and a spectral filter having spectral characteristics, said spectral filter placed at a position along said fiber to modify the spectral shape of said optical signal, said length of said optical fiber, said position of said spectral filter and said spectral characteristics of said filter chosen to produce a stable mean wavelength of said optical signal in the presence of variations in at least one operating parameter, said at least one operating parameter selected from the group consisting of pump, wavelength, pump power feedback and temperature.

2. A stable, ASE source as defined in claim 1, wherein said at least one operating parameter is pump wavelength.

3. A stable, ASE source as defined in claim 1, wherein said at least one operating parameter is pump power.

4. A stable, ASE said at least on in claim 1, wherein said at least one operating parameter is feedback.

5. A stable, ASE source as defined in claim 1, wherein said at least one operating parameter is temperature.

6. A stable, ASE source as defined in claim 1, wherein said at least one operating parameter comprises pump wavelength and pump power.

7. A stable, ASE source as defined in claim 1, wherein said at least one operating parameter comprises pump wavelength and feedback.

8. A stable, ASE source as defined in claim 1, wherein said at least one operating parameter comprises pump power and feedback.

9. A stable, ASE source as defined in claim 1, wherein said at least one operating parameter comprises pump wavelength, pump power and feedback.

10. A stable, ASE source as defined in claim 1, wherein said at least one operating parameter comprises pump wavelength, pump power, feedback and temperature.

11. A method for generating a stable amplified spontaneous emission, comprising the steps of:

injecting pump light from a pump light source into a length of optical fiber doped with a rare-earth element, said pump light propagating in said fiber and stimulating emission of an optical signal from said fiber, said optical signal having a spectral shape and a mean wavelength;

modifying said spectral shape of said optical signal using a spectral filter having spectral characteristics and positioned at a location along said length of optical fiber; and choosing said length of said optical fiber, said spectral characteristics of said filter and said position of said filter on said fiber to produce a stable mean wavelength of said optical signal from said fiber in the presence of variations in at least one operating parameter, said at least one operating parameter selected from the group consisting of pump wavelength, pump power, feedback and temperature.

12. The method as defined in claim 11, wherein said at least one operating parameter is pump wavelength.

13. The method as defined in claim 11, wherein said at least one operating parameter is pump power.

14. The method as defined in claim 11, wherein said at least one operating parameter is feedback.

15. The method as defined in claim 11, wherein said at least one operating parameter is temperature.

16. The method as defined in claim 11, wherein said at least one operating parameter comprises pump wavelength and pump power.

17. The method as defined in claim 11, wherein said at least one operating parameter comprises pump wavelength and feedback.

18. The method as defined in claim 11, wherein said at least one operating parameter comprises pump power and feedback.

19. The method as defined in claim 11, wherein said at least one operating parameter comprises pump wavelength, pump power and feedback.

20. The method as defined in claim 11, wherein said at least one operating parameter comprises pump wavelength, pump power, feedback and temperature.

21. The method as defined in claim 11, wherein said location along said fiber is selected to provide an optimum stability for said mean wavelength with respect to said operating parameter.

22. A method for providing a stable operating point for a fiber amplified spontaneous emission source, said method comprising:

injecting pump light from a pump light source into a length of optical fiber doped with a rare-earth element, said pump light propagating in said fiber and stimulating emission of an optical signal from said fiber, said optical signal having a spectral shape and a mean wavelength;

selecting a spectral characteristic for a spectral filter; and positioning said spectral filter at a selected location on said optical fiber, said length of said optical fiber, said spectral characteristic of said filter and said location of said filter on said fiber selected to produce a stable mean wavelength of said optical signal from said fiber in the presence of variations in at least one operating parameter, said at least one operating parameter selected from the group consisting of pump wavelength, pump power, feedback and temperature.

23. The method as defined in claim 22, wherein said at least one operating parameter is pump wavelength.

24. The method as defined in claim 22, wherein said at least one operating parameter is pump power.

25. The method as defined in claim 22, wherein said at least one operating parameter is feedback.

26. The method as defined in claim 22, wherein said at least one operating parameter is temperature.

27. The method as defined in claim 22, wherein said at least one operating parameter comprises pump wavelength and pump power.

28. The method as defined in claim 22, wherein said at least one operating parameter comprises pump wavelength and feedback.

29. The method as defined in claim 22, wherein said at least one operating parameter comprises pump power and feedback.

30. The method as defined in claim 22, wherein said at least one operating parameter comprises pump wavelength, pump power and feedback.

31. The method as defined in claim 22, wherein said at least one operating parameter comprises pump wavelength, pump power, feedback and temperature.

32. A stable, amplified spontaneous emission (ASE) source comprising:

an optical fiber doped with a rare-earth element;

a pump light source which injects optical energy into said fiber to stimulate emission of an optical signal from said fiber, said optical signal having a spectral shape and a mean wavelength, said spectral shape having at least first and second peaks of spectral power density at corresponding first and second optical wavelengths; and a spectral filter placed at a position along said fiber to modify the spectral shape of said optical signal in order to reduce the spectral power density of said first peak to produce a stable mean wavelength of said optical signal in the presence of variations of at least one operating parameter, wherein said at least one operating parameter is selected from the group of pump wavelength, pump power, feedback and temperature.

33. A method for generating a stable amplified spontaneous emission, comprising the steps of:

injecting pump light from a pump light source into an optical fiber doped with a rare-earth element, said pump light propagating in said fiber and stimulating emission of an optical signal from said fiber, said optical signal having a spectral shape and a mean wavelength, the spectral shape having at least first and second peaks of spectral power density at corresponding first and second optical wavelengths; and modifying said spectral shape of said optical signal using a spectral filter positioned at a location along said fiber to reduce the power density of said first peak to produce a stable mean wavelength of said optical signal in the presence of variations in at least one operating parameter, said at least one operating parameter selected from the group of pump wavelength, pump power, feedback and temperature.

34. A method for providing a stable operating point for a fiber amplified spontaneous emission source, said method comprising:

injecting pump light from a pump light source into an optical fiber doped with a rare-earth element, said pump light propagating in said fiber and stimulating emission of an optical signal from said fiber, said optical signal having a spectral shape and a mean wavelength, said spectral shape having at least first and second peaks of spectral power density at corresponding first and second optical wavelengths;

selecting a length for said fiber;

selecting a spectral characteristic for a spectral filter; and positioning said spectral filter on said optical fiber at a location selected to reduce the spectral power density at said first peak to produce a stable mean wavelength of said optical signal in the presence of variations in at least one operating parameter, said at least one operating parameter selected from the group consisting of pump wavelength, pump power, feedback and temperature.

* * * * *

UNITED STATES PATENT AND TRADEMARK OFFICE
CERTIFICATE OF CORRECTION

PATENT NO. : 5,875,203
DATED : February 23, 1999
INVENTOR(S) : Craig W. Hodgson, et al.

It is certified that error appears in the above-identified patent and that said Letters Patent is hereby corrected as shown below:

Column 12,
Line 42, change "pump power feedback" to -- pump power, feedback --.

Signed and Sealed this

Second Day of October, 2001

Attest:

*Nicholas P. Godici*

NICHOLAS P. GODICI
*Attesting Officer*    *Acting Director of the United States Patent and Trademark Office*